United States Patent
Wakumoto et al.

(10) Patent No.: US 10,230,698 B2
(45) Date of Patent: Mar. 12, 2019

(54) ROUTING A DATA PACKET TO A SHARED SECURITY ENGINE

(71) Applicant: Hewlett-Packard Development Company, L.P., Houston, TX (US)

(72) Inventors: Shaun Wakumoto, Roseville, CA (US); Craig Joseph Mills, Roseville, CA (US); Parvez Syed Mohamed, Roseville, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 412 days.

(21) Appl. No.: 14/773,187

(22) PCT Filed: Mar. 8, 2013

(86) PCT No.: PCT/US2013/029799
§ 371 (c)(1),
(2) Date: Sep. 4, 2015

(87) PCT Pub. No.: WO2014/137351
PCT Pub. Date: Sep. 12, 2014

(65) Prior Publication Data
US 2016/0014098 A1 Jan. 14, 2016

(51) Int. Cl.
*H04L 29/06* (2006.01)

(52) U.S. Cl.
CPC ........ *H04L 63/0485* (2013.01); *H04L 63/162* (2013.01)

(58) Field of Classification Search
CPC .......................... H04L 63/0485; H04L 63/162
USPC ........................................................ 713/167
See application file for complete search history.

(56) References Cited

U.S. PATENT DOCUMENTS

| | | | |
|---|---|---|---|
| 7,051,259 B1 * | 5/2006 | Williams, Jr. | H04L 1/0041 714/752 |
| 7,634,650 B1 | 12/2009 | Shah et al. | |
| 7,690,040 B2 * | 3/2010 | Frattura | G06F 21/6263 713/193 |
| 7,729,276 B2 | 6/2010 | Akyol | |
| 8,010,801 B2 | 8/2011 | Qi et al. | |
| 8,295,312 B2 | 10/2012 | Diab et al. | |
| 8,509,616 B2 * | 8/2013 | Julien | H04L 49/557 398/141 |
| 2005/0071628 A1 * | 3/2005 | Yang | H04L 63/0428 713/151 |
| 2005/0111471 A1 * | 5/2005 | Krischer | H04L 12/4633 370/412 |

(Continued)

OTHER PUBLICATIONS

"10G Datacom Product Line," Applied Micro, Oct. 2009, pp. 1-12.
International Search Report and Written Opinion, International Application No. PCT/US2013/029799, dated Dec. 6, 2013, pp. 1-9.

*Primary Examiner* — Samson B Lemma
(74) *Attorney, Agent, or Firm* — Hewlett Packard Enterprise Patent Department

(57) ABSTRACT

Examples disclose a system comprising an integrated circuit to determine whether a data packet should be processed by a shared security engine associated with a secure link. Additionally, the examples disclose a first media access control (MAC), associated with the shared security engine, to receive the data packet for transmission on the secure link based on the determination the data packet should be processed by the shared security engine.

16 Claims, 6 Drawing Sheets

(56) References Cited

U.S. PATENT DOCUMENTS

| | | | |
|---|---|---|---|
| 2005/0114490 A1* | 5/2005 | Redlich | H04L 12/2856 709/223 |
| 2008/0031155 A1 | 2/2008 | Korus et al. | |
| 2008/0130617 A1* | 6/2008 | Singh | H04L 1/1671 370/345 |
| 2010/0217971 A1* | 8/2010 | Radhakrishnan | H04L 69/22 713/153 |
| 2010/0229013 A1 | 9/2010 | Diab et al. | |
| 2011/0153985 A1* | 6/2011 | Saha | G06F 21/602 712/42 |
| 2012/0011360 A1 | 1/2012 | Engels et al. | |

\* cited by examiner

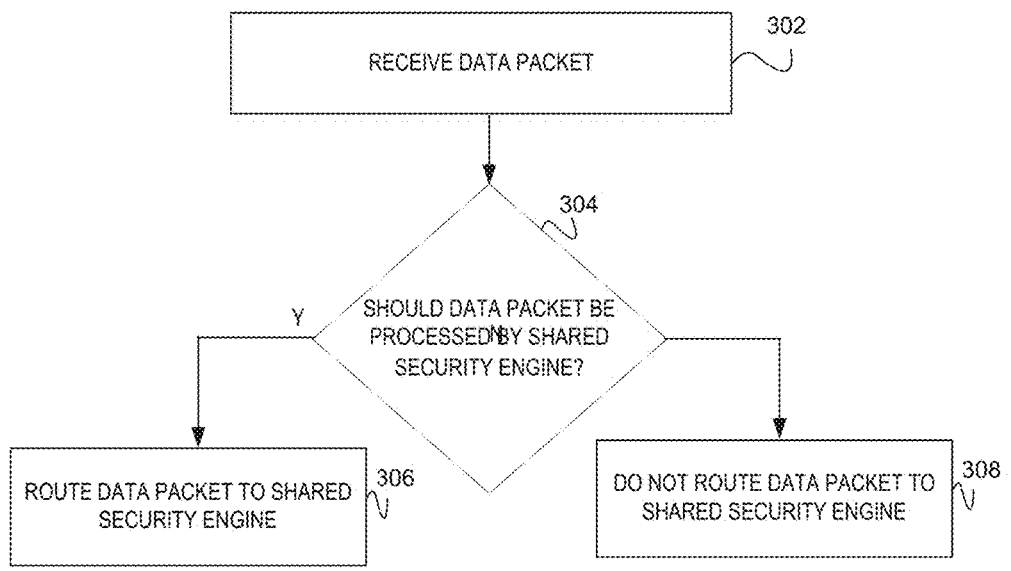

ROUTING A DATA PACKET TO A SHARED SECURITY ENGINE

BACKGROUND

Computer networks, such as those compliant with IEEE 802® standards, may be deployed in many type of environments, such as a home and/or business. These protocols may establish the security settings to prevent unauthorized access to data traffic. The security settings may include maintaining confidentiality of transmitted data and/or preventing unauthorized access to the transmitted data.

BRIEF DESCRIPTION OF THE DRAWINGS

In the accompanying drawings, like numerals refer to like components or blocks. The following detailed description references the drawings, wherein:

FIG. 3 is a flowchart of an example method to receive a data packet, determine whether the data packet should be processed by a shared security engine, and route the data packet to the shared security engine;

DETAILED DESCRIPTION

Figure 1:
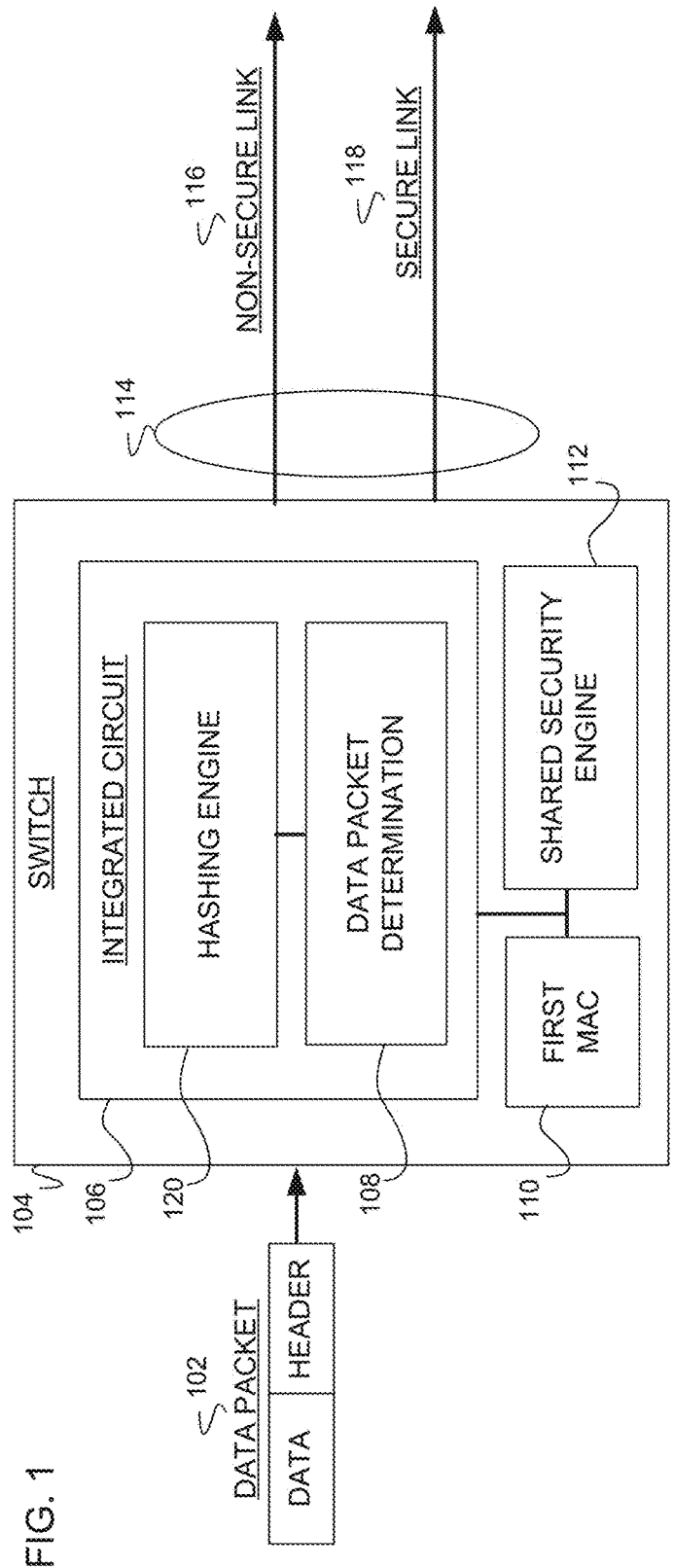
FIG. 1 is a block diagram of an example switch including an integrated circuit to receive a data packet and to determine whether the data packet should be processed by the shared security engine.

Security settings may be implemented by using a dedicated security engine per communication channel, to maintain data confidentiality and integrity. However, this may increase system costs and complexity. Although hardware components may be altered to provide security within the networking system, such alterations may require modifications of various other hardware components. Further, it may be burdensome to the networking system to implement security for each transmission and receipt of client traffic, as this may cause a time latency. For example, the client traffic may include data packets that are processed serially in a queue, exacerbating the time latency associated with processing the data packets in series. Such dedicated security implementations have various other limitations associated with increased costs, space, and design complexity of a networking system.

To address these issues, examples disclosed herein provide a more cost-efficient and less complex design within the networking system by utilizing a shared security engine among multiple links or communication channels. The examples disclosed herein provide a process to determine whether a data packet should be processed by the shared security engine associated with a secure link. Determining whether the data packet should be processed for security reasons, prevents the time latency as the data packets may be selectively chosen for encryption and/or decryption by the shared security engine.

Additionally, the examples provide the process for an integrated circuit to route the data packet to the shared security engine upon the determination the packet should be processed by the shared security engine. Routing the data packet to the shared security engine, enables the process to provide decryption at the ingress of a data packet into the networking system and encryption upon egress of the data packet onto the secure link. Providing this encryption and decryption further enables the networking system to use fewer hardware components while maintaining data confidentiality and integrity. This reduces the overall number of security engines per networking system, as the system may utilize the shared security engine among multiple communication channels or links.

In another example, the process determines whether the shared security engine is operating with a maximum number of secure associations and routes the data packet to a shared security engine with an available secure association to provide security. This example provides an additional level of efficiency as the number of secure associations per security engine may be limited. Thus routing the client traffic to the security engine with the available secure association provides security to the client traffic which may be unsecured, otherwise.

In a further example, the process further determines whether the data packet may be encrypted upon ingress into the networking system and routing the data packet for decryption to a first media access control (MAC). The process receives the decrypted data packet from a second MAC. This process provides a cost-efficient process to enable security among data packets.

In summary, examples disclosed herein provide a shared security engine to maintain data confidentiality and integrity among multiple communication channels or links. The shared security engine reduces the number of security components in a networking system, while also providing data security. Additionally, the examples disclosed herein prevent time latency by enabling selection of data packets for encryption and/or decryption.

Referring now to the figures, FIG. 1 is a block diagram of an example switch 104 in a networking system. The networking system is a collection of networking devices and other hardware which may be interconnected by communication channels, such as a non-secure link 116 and a secure link 118. The networking system as depicted in FIG. 1 represents an Open Systems Interconnection (OSI) model for communicating with other networking devices. These networking systems may include wide area network (WAN), local area network (LAN), Ethernet, optic cable network, or other type of networking system. The switch 104 includes an integrated circuit 106 to receive a data packet 102 and module 108 to determine whether the data packet should be processed by a shared security engine 112. If the integrated circuit 106 determines the data packet 102 should be processed by the shared security engine 112, the data packet is routed to a first media access control (MAC) 110. The integrated circuit 106 further includes a hashing engine 120 to choose a port for transmission on one of the links 116 or 118 to transmit the data packet 102. The switch 104 is a networking component that links network devices together. As such, the switch 104 may include multiple links (not illustrated) in addition to the non-secure link 116 and the secure link 118. The switch 104 may route client traffic (e.g., data packet(s) 102) to a data link layer or a network link layer of the OSI model. In implementations, the switch 104 may include a point to point connection with another switch through the links 116 and 118. In further implementations, the switch 104 is included as part of a blade server component. Implementations of the switch 104 include a multi-port network device, multi-layer switch, or other type of networking component capable of providing the physical connections through wired connections or wireless connections between networking devices.

The data packet 102 includes data and a header for the integrated circuit 106 to process at module 108. At module 108, a decision is determined of whether the data packet 102 should be routed to the shared security engine 112 for processing or to the hashing engine 120. The data packet 102 is considered a portion of aggregate data and metadata. The aggregate data may include client traffic, a data stream, and/or data frames. In one implementation, the integrated circuit 106 may receive the data packet 102 as it ingresses into the switch 104. In this implementation, the data packet 102 may be processed to determine whether it is encrypted and routed to the shared security engine 112 for decryption. In another implementation, the data packet 102 may be processed as it egresses from the switch 104. In this implementation, the data packet 102 may be processed to determine if the data packet 102 contains sensitive data, indicating the data packet 102 should be processed through the shared security engine 112 to provide protection. For example, the data packet 102 may include personal information, indicating this data should be encrypted prior to transmission on the secure link 118 to maintain confidentiality. The sensitive data may be identified using a header of the data packet 102 and as such may be identified by the application type of the data packet 102, the source of the data packet 102, the destination of the data packet 102, and/or whether the data packet 102 may have been received upon ingress or egress to the switch 104.

The integrated circuit 106 may receive the data packet 102 upon ingress or egress of the data packet 102 from the switch 104. Upon ingress, the integrated circuit 106 receives the data packet 102 for determining whether the data packet may be encrypted at module 108 and routing the encrypted data packet to the shared security engine 112 for decryption. Upon egress, the integrated circuit 106 receives the data packet 102 and determines whether the data packet 102 contains sensitive data that indicates it should be encrypted by the shared security engine 112. Once encrypting the data packet 102 by the shared security engine 112, the data packet 102 is transmitted on the secure link 118. In a further example, if the integrated circuit 106 determines the data within the data packet 102 is without sensitive data, the integrated circuit 106 may route the data packet 102 to the hashing engine 120 for transmission on the non-secure link 116. In one implementation, the integrated circuit 106 may communicate with a controller (not illustrated) to obtain a secure association for encryption and/or decryption of the data packet 102. Implementations of the integrated circuit 106 include an application-specific integrated circuit (ASIC), controller, microprocessor, microchip, chipset, electronic circuit, semiconductor, microcontroller, central processing unit (CPU), or other programmable device capable of receiving the data packet 102 and executing module 108.

The module 108 processes the header of the data packet 102 for the sensitive type of data which indicates to the integrated circuit 106, the data packet 102 should be processed for security reasons to maintain data confidentiality and integrity. Implementations of the module 108 include a set of instructions, instruction, process, operation, logic, algorithm, technique, logical function, firmware, and or software executable by the integrated circuit 106 to determine whether the data packet 102 contains sensitive data that may warrant processing through the shared security engine 112 to maintain data confidentiality and integrity.

The first media access control (MAC) 110 acts as an interface between the logical link layer and the network's physical layer (PHY). As such, the first MAC 110 is considered a sub-layer to the data link layer in the OSI model of the networking system. In this regard, the first MAC 110 emulates a full-duplex logical communication channel in the networking system.

The shared security engine 112 is a hardware component within the networking system which is configured to provide network security for the data packet 102. The shared engine 112 may be shared among several client devices using the same secure channel or multiple secure channels (i.e., links 116 and 118). Sharing the engine 112 among multiple links 116 and 118 decreases the number of security components for encryption or decryption. The security techniques employed by the shared security engine 112 may include the exchange of cipher keys, symmetric keys, associated encryption/decryption, and authentication techniques to provide network security. In one implementation the shared security engine 112 provides network security by decrypting the data packet 102 upon ingress and encrypting the data packet 102 upon egress form the switch 104. In this implementation, shared security engine 112 may include multiple secure associations and as such, may include a secure association table. The table includes the multiple secure associations with the secure identifiers and the corresponding keys. The table may be used to identify the given corresponding key to encrypt or decrypt the data packet 102. This implementation is described in detail in later figures. In other implementations, the shared security engine 112 may be specific to a given MAC, such as the first MAC 110 or specific to multiple MACs. In another further implementation, the shared security engine 112 may include a media access control security (MACSec). The MACSec is a hardware component which defines connectionless data confidentiality and integrity among the first MAC 110 and/or other MACs. Although FIG. 1 illustrates the shared security engine 112 as independent of the integrated circuit 106, implementations should be limited to this illustration as the shared security engine 112 may be part of the first MAC 110, the integrated circuit 106, or as part of a network PHY.

The non-secure link 116 and the secure link 118 include physical ports on the switch 104 which and operate as communication channels or links between the switch 104 and another security-enabled networking device for data communications. The secure link 118 may be aggregated with the non-secure link 116 by combining these links in parallel to increase the throughput beyond what a single link may be capable of transmitting as symbolized by 114. For example, the link aggregation may include the logical formation of multiple links to form a single logical link between the switch 104 and another networking device. The aggregation of these links may also provide redundancy if either the secure link 118 or the non-secure link 116 may fail. The links are aggregated together at the second layer and third layers of open systems interconnection (OSI) model or combination thereof. These layers which implement the aggregation may include the data link layer and/or network layer. The secure link 118, secures the data packet 102 that was encrypted by the shared security engine 112; however the shared security engine 112 rather than the secure link 118 performs the encryption. Specifically, the secure link 118 transmits this encrypted data packet to another networking device. In another implementation, the shared security engine 112 may decrypt the data packet 102. The decrypted data packet is routed back to back to the integrated circuit 106. The integrated circuit 106 then processes the decrypted packet. In this regard, the shared security engine 112 may appear transparent to the networking system which enables the shared security engine 112. The non-secure link 116 is considered the communication channel for the transmission of the data packet 102 without the security means. Specifically, the data packet 102 may not include sensitive data that would trigger the integrated circuit 106 to route the data packet to the first MAC 110 for encryption by the shared security engine 112. Additionally, although FIG. 1 illustrates two links 116 and 118, implementations should not be limited to this illustration as the there may be multiple non-secure links and/or multiple secure links.

The hashing engine 120 is a data structure enabled to identify the port for use with the corresponding link 116 or 118 for transmission. If it is determined the data packet 102 should be processed by the shared security engine 112 for encryption, the hashing engine 120 may be bypassed as the encrypted data packet is transmitted on the secure link 118. In turn, if it is determined the data packet 102 is without sensitive data, the hashing engine 120 directs the data packet 102 to the particular port for transmission on the corresponding link 116 and/or 118.

Figures 2A, 2B:
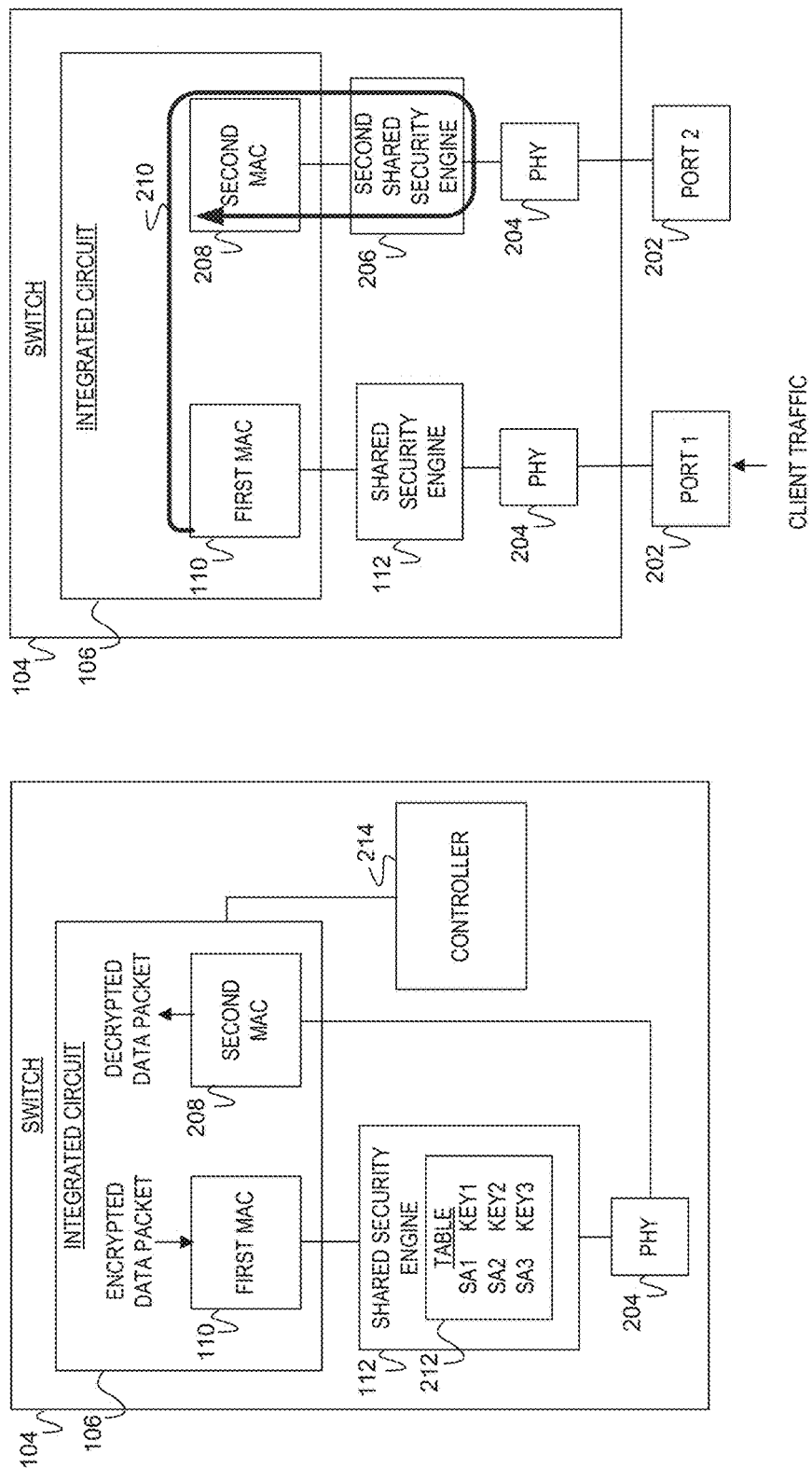
FIG. 2A is a diagram of an example switch including an integrated circuit to identify whether a data packet is encrypted upon ingress to the switch and route the encrypted data packet to a shared security engine for decryption.
FIG. 2B is a diagram of an example switch including an integrated circuit to identify a second shared engine with an available secure association based on a determination a shared security engine is operating with a maximum number of secure associations.

FIG. 2A is a block diagram of an example switch 104 including an integrated circuit 106 to identify whether a data packet is encrypted upon ingress to the switch 104. The data packet 102, in accordance with FIG. 1, enters the switch 104 for the integrated circuit 106 to determine whether the data packet is encrypted. Upon determining the data packet is encrypted, the integrated circuit 106 routes the encrypted data packet to the first MAC 110 for decryption. The data packet further includes a secure association identifier for the shared security engine 112 to identify the corresponding key as in a table 212. The table 212 may be stored in memory component within the shared security engine 112 and in another memory component internal to the controller 214. The secure identifier is a value that enables the security engine 112 to identify the key for encryption and/or decryption as the shared security engine 112 may contain multiple keys for multiple communication channels. For example, the shared security engine 112 includes the table 212 for multiple secure associations and includes secure identifiers (i.e., SA1, SA2, and SA3), and the corresponding keys (KEY1, KEY2, KEY3). If a secure association has not yet been established by the shared security engine 112, the integrated circuit 106 communicates with the controller 214 to negotiate the secure association and obtain keys for encryption at the shared security engine 112. The table 212 may also be used by the controller 214 to track the number of secure associations available at each security engine 112 and 206 as in FIG. 2B. In this implementation, the controller 214 includes a table 212 internal to itself to track the secure associations. Although FIGS. 2A-2B illustrate the shared security engines 112 and 206 as separate from the integrated circuit 106 and/or PHY 204, implementations should not be limited as this was done for illustration purposes. For example, the shared security engines 112 and 206 may be included in the integrated circuit 106 or as part of the PHY 204.

In FIG. 2A, the MACS 110 and 208 are dedicated to receiving the data packet for encryption and/or decryption from the integrated circuit 106. The data packet may then be routed to a port for transmission on a link to establish a communication channel with another networking device, such as a switch. In this implementation, the MACS 110 and 208 receive communications from the integrated circuit 106 and as such, a third MAC (not pictured) routes the encrypted data packet on a selected port to establish a communication channel with other networking components. For example, the integrated circuit 106 may receive client traffic (e.g., data packet) from third MAC connected to an external port. The integrated circuit 106 will route this data packet to the first MAC 110 for decryption. Likewise, the client traffic (e.g., data packet) for transmission or egress of the data packet from the switch 104, may be received on the second MAC 208 and encrypted by the shared security engine 112. The integrated circuit 106 receives the encrypted packet and routes the encrypted packet out to the third MAC for transmission on the secure link. This reduces the number of individual security engines per networking system, as the system may utilize the shared security engine 112 among multiple communication channels for providing data security. The two MACS 110 and 208 are connected together through the shared security engine 112 and a physical interface (PHY) 204. The PHY 204 is the physical interface and includes the hardware to connect the MACS 110 and 208. The PHY 204 is the hardware mechanism that contains a transceiver which electrically interfaces to a physical link and is the common abbreviation for the physical layer of the OSI model. This creates an internal loopback connection for the shared security engine 112 to decrypt the data packet upon ingress into the switch 104 or encrypt the data packet upon egress from the switch 104.

FIG. 2B is a block diagram of an example switch 104 including integrated circuit 106 to identify a second shared engine 206 with an available secure association. The second shared engine 206 is identified based on a determination the shared security engine 112 is operating with a maximum number of secure associations. The second MAC 208 associated with the second shared engine 206 receives the data packet for processing. The ports 202 serve as an interface between the switch 104 and other networking devices to receive client traffic (e.g., data packets). These ports 202 may be used to receive and transmit the data packets through the links 116 and 118.

FIG. 2B illustrates the situation when the maximum number of secure associations (i.e., pair of keys) are exhausted at a particular engine 112. Once the number of maximum secure associations has been reached by the shared security engine 112, the integrated circuit 210 redirects the client traffic from the first port as indicated by the arrow 210. There are a limited number of keys to use for a given system, as defined by a vendor for the shared security engine 112. Thus, the maximum number of secure associations is a pre-defined number of pairs of keys to ensure security for a given number of clients in the networking system. Rather than ignore client traffic which should be processed by the shared security engine 112, the integrated circuit 106 utilizes the available secure association and redirects the data packets accordingly.

For example, the first port 202 may be servicing four clients by providing security protection with these data packets upon ingress and egress from the first port 202. In this example, shared security engine 112 may include available secure associations for the four clients and may not have an available secure association to service an additional client. Thus, the controller 214 as in FIG. 2A may utilize the table 212 internal to itself to track the number of secure associations at each shared security engine 112 and 206. The controller 214 may track when the shared security engine 112 has the maximum number of secure associations and communicate with the integrated circuit 106 to direct the additional client to the second MAC 208 for processing by the second shared security engine 206. In a further implementation, the key pair may specific to a particular client and as such, the keys for encryption and decryption may be obtained by the integrated circuit 106 from the controller 214 for placement in the second shared engine 206.

FIG. 3 is a flowchart of an example method to receive a data packet, determine whether the data packet should be processed by a shared security engine, and route the data packet to the shared security engine. In discussing FIG. 3, references may be made to the components in FIGS. 1-2B to provide contextual examples. Further, although FIG. 3 is described as implemented by an integrated circuit 106 as in FIG. 1, it may be executed on other suitable components. For example, FIG. 3 may be implemented in the form of executable instructions on a machine readable storage medium, such as machine-readable storage medium 604 as in FIG. 6.

At operation 302, the integrated circuit receives a data packet. The data packet may also include a portion of a data stream and as such, FIG. 3 may include selectively securing particular packets in the given data stream. The data packet includes header information for the integrated circuit to process to determine whether the data packet should be processed by the shared security engine at operation 304 for transmission on a secure link. The secure link, associated with the shared security engine, provides the ability to secure the data packet by encryption for transmission to another type of security-enabled networking device. In this regard, since the data packet is encrypted prior to transmission, the secure link is considered dedicated to the secure transmission of the data packet. The non-secure link is considered the link for transmission of data without the security for encryption. The secure link is aggregated with a non-secure link by combining these links in parallel to increase the throughput beyond what a single link may be capable of transmitting.

At operation 304, the integrated circuit determines whether the data packet should be processed by a shared security engine for transmission on the secure link. The data packet is analyzed to determine whether it may contain sensitive data. The sensitive data may be identified using a header of the data packet, application type of the data packet, and whether the data packet may have been received in ingress or egress from a networking system. At operation 304, data packets may be selectively chosen for encryption based on the sensitive data. In one implementation, operation 304 processes the header corresponding to the data packet for the sensitive data. For example, the data packet may include credit card information and as such, should be encrypted to maintain confidentiality to the data packet as it is transmitted on the secure link. In this implementation, operation 304 may include the hashing engine 120 as in FIG. 1, which may be bypassed if the determination is the data packet should be processed by the shared security engine for security reasons. Additionally, if the switch includes multiple ports with multiple secure links, each link associated with the shared security engine, the hashing engine 120 may be utilized to determine which link (i.e., communication channel) to transmit the encrypted data packet. In another implementation, the integrated circuit may process the data packet for time sensitive data. In this implementation, the data packet may be directed to the non-secure link for immediate transmission. In this implementation, the shared security engine may cause time latency as the data packet may be encrypted or decrypted prior to transmission, thus to prevent the time latency the data packet may be transmitted on the non-secure link. In a further implementation, if the integrated determines the data packet need not be processed (i.e., no sensitive data), the data packet is routed to operation 308. Operation 308 may include routing the data packet to the non-secure link for transmission. These implementations are explained in further detail in accordance with FIGS. 4-5.

At operation 306, the integrated circuit routes the data packet to the shared security engine for transmission on the secure link. The data packet is routed based on the determination at operation 304 the data packets should be processed for encryption by the shared security engine. The shared security engine maintains confidentiality of transmitted and received data packets to prevent unauthorized data and/or devices from propagating within a network. As such, the shared security engine may be used across multiple links (e.g., secure links) to provide cryptography techniques. The cryptography techniques may include the exchange of cipher keys, associated encryption/decryption, and authentication techniques to provide network security. In one implementation, operation 306 may determine whether the shared security engine is operating with the maximum number of secure associations and then identify a second shared security engine with an available secure association. The second shared security engine to process the data packet instead of the shared security engine. In another implementation, the integrated circuit identifies whether the data packet was encrypted and routes the data packet to a first MAC associated with the shared security engine. The shared security engine decrypts the data packet and the integrated circuit receives the decrypted data packet from a second MAC. These implementations are discussed in further detail in accordance with FIGS. 4-5.

At operation 308, if the integrated circuit determines the data packet is without sensitive data, the data packet is not routed to the shared security engine. In another implementation, operation 308 may include transmitting the data packet on the non-secure link.

Figure 4:
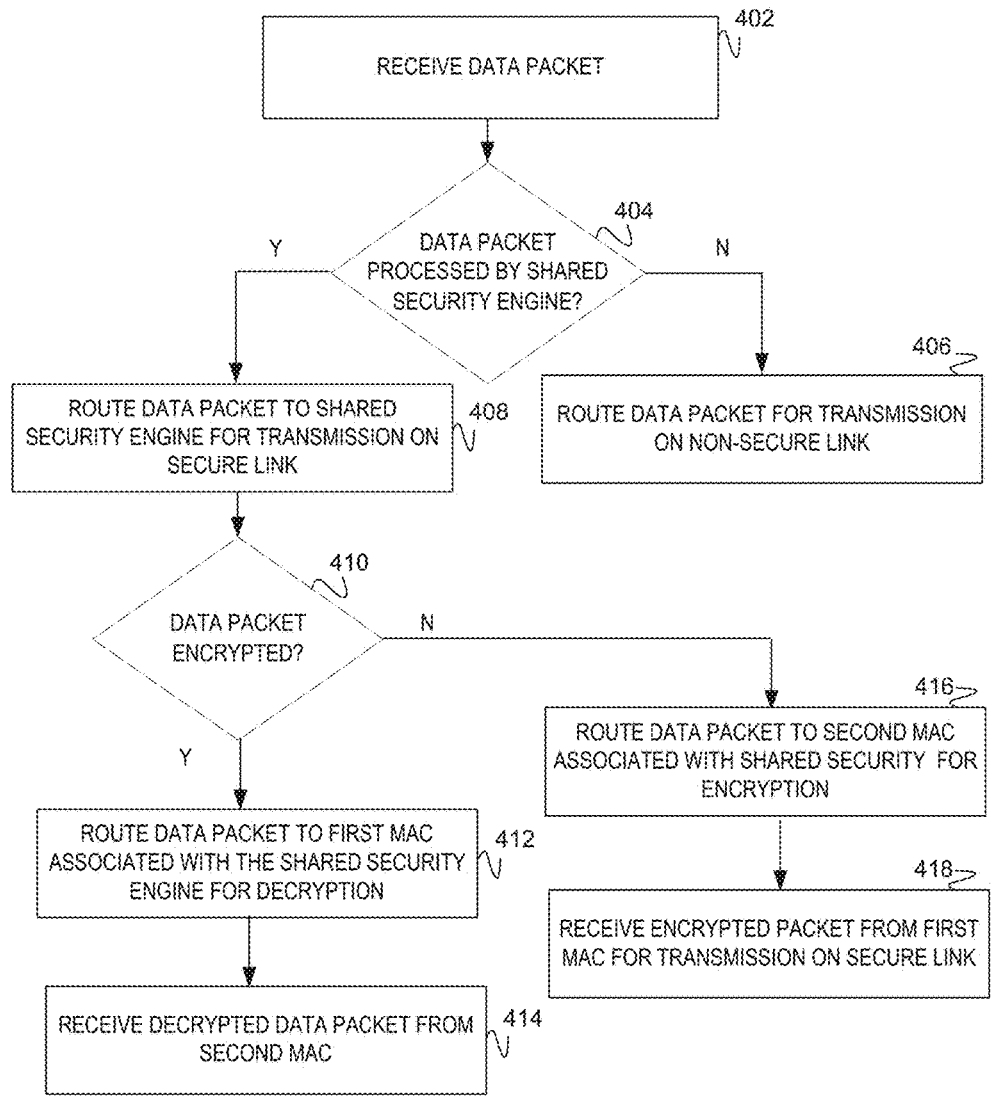
FIG. 4 is a flowchart of an example method to receive a data packet and depending whether the data packet should be processed by the shared security engine, the data packet is either routed for transmission on a non-secure link or to the shared security engine for transmission on a secure link.

FIG. 4 is a flowchart of an example method to receive a data packet and depending whether the data packet should be processed by the shared security engine, the data packet is either routed for transmission on a non-secure link or to the shared security engine for transmission on a secure link. In discussing FIG. 4, references may be made to the components in FIGS. 1-2B to provide contextual examples. Further, although FIG. 4 is described as implemented by an integrated circuit 106 as in FIG. 1, it may be executed on other suitable components. For example, FIG. 4 may be implemented in the form of executable instructions on a machine readable storage medium, such as machine-readable storage medium 604 as in FIG. 6.

At operations 402-404, the data packet is received by the integrated circuit for determination of whether the data packet should be processed by the shared security engine.

Operation 404 includes the process in which the data packet may either be transmitted on a secure link or non-secure link as at operations 406 or 408. The determination of which link to transmit the data packet depends on whether the integrated circuit determines the data packet should be processed by the shared security engine for security purposes. For example, if the integrated circuit determines the data packet may not be processed, the process moves to operation 406 for transmission on the non-secure link. If the integrated circuit determines the data packet may contain sensitive data, the data packet should be processed to provide security and the process moves to operation 408. Operations 402-404 may be similar in functionality to operations 302-304 as above in accordance with FIG. 3.

At operation 406, the integrated circuit routes the data packet to the non-secure link for transmission upon determination the data packet is without sensitive data and as such, may not need to be processed by the shared security engine at operation 404. This indicates particular data packets may be selected by the sensitivity of the data itself and processed by the share security engine as at operation 408. For example, certain types of data packets may need to be secured and with a single link, each data packet may be encrypted prior to transmission. In this example, the packets are processed serially and non-sensitive type of data packets may be in queue behind a sensitive type of data packet, causing a time latency with the data packets. Selecting particular types of data packets for processing by the shared security engine at operation 408 prevents this type of time latency as the data packets may be transmitted on multiple links. In another implementation, operation 406 includes a hashing engine to select a port to direct the data packet to for transmission on the non-secure link.

At operation 408 the integrated circuit routes the data packet to the shared security engine for transmission on the secure link. In one implementation, the integrated circuit may further determine whether the data packet is encrypted as at operation 410 to either move the process to operations 412-414 or 416-418. Operation 408 may be similar in functionality to operation 306 as in accordance with FIG. 3.

At operation 410, the integrated circuit may further determine whether the data packet is encrypted. If the data packet is encrypted, then the data packet is routed to a FIRST MAC for the shared security engine to decrypt as at operations 412-414. Operations 412-414 occur upon ingress of the data packet in the networking system for routing to an internal component within the networking system. In turn, if the data packet is not encrypted (i.e., decrypted), the integrated circuit routes the data packet to the second MAC for encryption as at operations 416-418. Operations 416-418 occur upon egress of the data to another networking device through the secure link. This provides an internal type of loopback connection to the integrated circuit for encrypting and/or decrypting data packets prior to transmission to an internal component or to another networking device. This reduces the number of security engines as the process may utilize the shared security engine to maintain data confidentiality.

At operation 412 the integrated circuit routes the data packet to the first MAC associated with the shared security engine upon determination the data packet is encrypted at operation 410. In one implementation, the shared security engine may include secure associations for multiple links, and as such, may include a type of secure association table. In this implementation, the data packet may include a secure association identifier for the shared security engine to identify a specific key corresponding to the secure association identifier. This provides another level of security to each of the links to maintain data confidentiality among the links.

At operation 414 the integrated circuit receives the decrypted data packet from the second MAC. The integrated circuit may then route the decrypted data packet to the authorized networking component or device. In one implementation, the key used to encrypt the data packet at operation 416 may correspond to a key used at operation 414 to decrypt the encrypted data packet. In this operation, the integrated circuit receives the decrypted data packet for internal processing within the network system.

At operations 416-418, the integrated circuit routes the data packet to the second MAC associated with the shared security engine upon determination the data packet is not encrypted (i.e., decrypted) at operation 410. It may be assumed if the data packet is not encrypted, the data packet should be encrypted upon egress from the networking system. Once receiving the encrypted data packet at operation 418, the encrypted data packet may be transmitted on the secure link.

Figure 5:
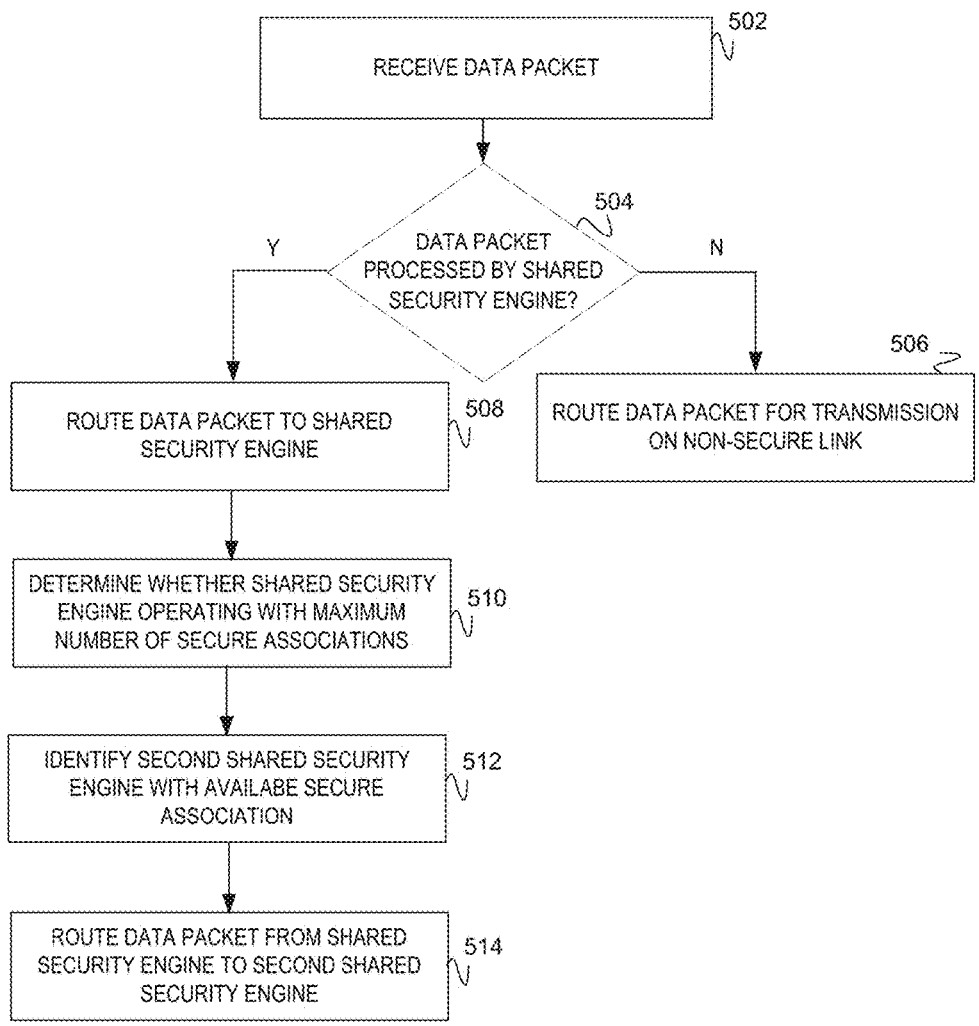
FIG. 5 is a flowchart of an example method to receive a data packet, route the data packet to either the shared security engine for transmission on a secure link or for transmission on a non-secure link, the example method further determines whether the shared security engine is in operation with a maximum number of associations and routes the data packet to a second shared security engine.

FIG. 5 is a flowchart of an example method to receive a data packet and determine the data packet should be processed by the shared security engine. Based upon this determination, a networking component may further determine whether the shared security engine is operation with a maximum number of associations. If the shared security engine is operating with the maximum number of secure association, the integrated circuit routes the data packet to a second shared security engine. FIG. 5 represents the situation of when the shared security engine may be overloaded with client traffic for encrypting and decrypting each respective data packet. Accordingly, the client traffic may be redirected to the available shared security engine. Additionally, FIG. 5 represents the situation of sharing available resources (e.g., secure associations) across multiple security engines. In discussing FIG. 5, references may be made to the components in FIGS. 1-2B to provide contextual examples. Further, although FIG. 5 is described as implemented by an integrated circuit 106 as in FIG. 1, it may be executed on other suitable components. For example, FIG. 5 may be implemented in the form of executable instructions on a machine readable storage medium, such as machine-readable storage medium 604 as in FIG. 6. Operations 502-508 may be similar in functionality to operations 402-408 as above in accordance with FIG. 4.

At operation 510, the integrated circuit determines whether the shared security engine at operation 508 is operating with a maximum number of secure associations. At operations 510, a controller may communicate with the integrated circuit to track the number of secure associations in use by each of the shared security engines. The controller may then communicate with the integrated circuit to redirect the data packet to the security engine which has an available secure association. The secure association represents a set of keys used for the security at each security engine; one key for encryption and the other key for decryption. The controller negotiates for each set of keys used in a secure association and as such, may utilize an internal table to track the number of secure associations at each security engine. These sets of keys may be programmed in each of shared security engines for providing data integrity; however, the number of keys may be limited according to the vendor of the shared security engine and as such, each shared security engine may be capable of handling a limited number secure associations. For example, the maximum number of keys may be exhausted at the shared security engine. In this example, the shared security engine may include the number of keys to support four clients for encryption and decryption, as such, when a fifth client requests a secure channel, the integrated circuit may utilize another shared security engine for the encryption and/or decryption. The controller may be part of the switch 104 and 204 as in FIGS. 1-2.

At operation 512, the integrated circuit identifies the second shared security engine with an available secure association. In this operation, the controller in communication with the integrated circuit, identifies the available secure association at the second shared security engine using a table internal to the networking system as discussed in accordance with operation 510. The table is utilized to track which secure association is in operation at each shared security engine for reference to identify which shared security engine may have the capabilities for the secure association.

At operation 514, the integrated circuit routes the data packet from the shared security engine to the second shared security engine with the available secure association. In this operation, the controller communicates with the integrated circuit to direct the client traffic in excess of the maximum number to the security engine in which has the available secure association. In one implementation, the second shared security engine may use secure associations different from the secure associations used at the shared security engine, thus the controller communicates with the integrated circuit for the integrated circuit to obtain the appropriate secure association for a given client's traffic (e.g., data packets). In this regard, the controller instructs the integrated circuit to redirect the traffic to the second shared security engine.

Figure 6:
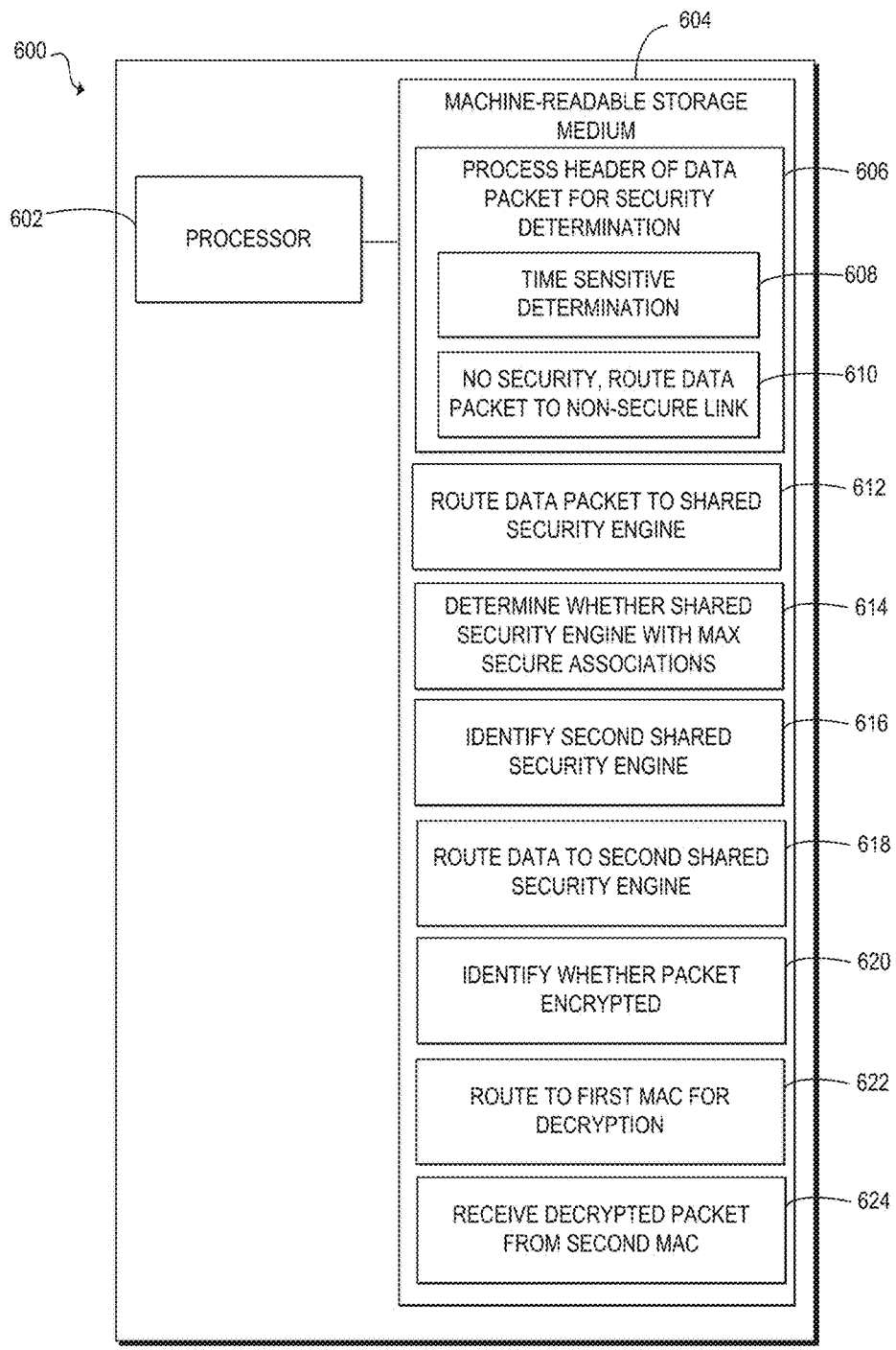
FIG. 6 is a block diagram of an example computing device with a processor to execute instructions in a machine-readable storage medium for processing a header of a data packet and routing the data packet accordingly.

FIG. 6 is a block diagram of computing device 600 with a processor 602 to execute instructions 608-624 within a machine-readable storage medium 604. Specifically, the computing device 600 with the processor 602 is to process a header of a data packet and routing the data packet accordingly. Although the computing device 600 includes processor 602 and machine-readable storage medium 604, it may also include other components that would be suitable to one skilled in the art. For example, the computing device 600 may include the integrated circuit 106 and/or switch 104 as in FIG. 1. The computing device 600 is an electronic device with the processor 602 capable of executing instructions 606-624, and as such embodiments of the computing device 600 include a computing device, mobile device, client device, personal computer, desktop computer, laptop, tablet, video game console, or other type of electronic device capable of executing instructions 606-624. The instructions 606-624 may be implemented as methods, functions, operations, and other processes implemented as machine-readable instructions stored on the storage medium 604, which may be non-transitory, such as hardware storage devices (e.g., random access memory (RAM), read only memory (ROM), erasable programmable ROM, electrically erasable ROM, hard drives, and flash memory.

The processor 602 may fetch, decode, and execute instructions 606-624 to process a header of a data packet and route the data packet accordingly. In one implementation, once executing instructions 606-610, the processor may then execute instructions 620-624. In another implementation, once executing instructions 606-610, the processor 602 may then execute instructions 612-618. Specifically, the processor 602 executes instructions 606-610 to: process the header of the data packet to determine if the data packet contains sensitive material; then determine if the data packet contains time-sensitive material; and if the data packet contains no sensitive nor time-sensitive material, the data packet is routed to the non-secure link for transmission. The processor may then execute instructions 612-618 to: route the data packet to the shared security engine; determine if the shared security engine is operating with the maximum number of secure associations; identify a second shared engine with an available secure association; and route the data packet to the second shared security engine. Once executing instructions 606-610, the processor 602 may other execute instructions 620-624 to: identify whether the data packet is encrypted; route the encrypted data packet to a first MAC associated with the shared security engine for decryption; and receive the decrypted data packet from a second MAC.

The machine-readable storage medium 604 includes instructions 606-624 for the processor to fetch, decode, and execute. In another embodiment, the machine-readable storage medium 604 may be an electronic, magnetic, optical, memory, storage, flash-drive, or other physical device that contains or stores executable instructions. Thus, the machine-readable storage medium 604 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, the machine-readable storage medium 604 may include an application and/or firmware which can be utilized independently and/or in conjunction with the processor 602 to fetch, decode, and/or execute instructions of the machine-readable storage medium 604. The application and/or firmware may be stored on the machine-readable storage medium 604 and/or stored on another location of the computing device 600.

In summary, examples disclosed herein provide a shared security engine to maintain data confidentiality and integrity among multiple communication channels or links. The shared security engine reduces the number of security components in a networking system, while also providing data security. Additionally, the examples disclosed herein prevent time latency by enabling selection of data packets for encryption and/or decryption.

We claim:

1. A system comprising:
an integrated circuit, coupled to a first media access control (MAC), to determine that a data packet should be processed by a security engine shared among multiple communication links including a secure link;
the first media access control (MAC), coupled to the security engine, te in response to the determination that the data packet should be processed by the security engine, receive the data packet for transmission on the secure link; and
the security engine specific to the first MAC to perform on a security function on the data packet prior to transmission on the secure link, wherein the integrated circuit is to:
determine that the shared security engine is operating with a maximum number of secure associations:
in response to the determination that the security engine is operating with a maximum number of secure associations, identify a second security engine, shared among the multiple communication links, with an available secure association:
route the data packet from the security engine to the second security engine;
a second media access control (MAC), associated with the second security engine, to receive the data packet for processing through the second security engine; and perform, at the second security engine, a cryptographic function on the data packet prior to transmission.

2. The system of claim 1 wherein the integrated circuit is to:
identify that the data packet is encrypted;
route the data packet to the first media access control (MAC) associated with the shared security engine for decryption.

3. The system of claim 1 comprising:
a hashing engine to in response to the determination that the data packet should not be processed by the security engine, receive the data packet; and
determine which non-secure link to transmit the data packet.

4. The system of claim 1 wherein the security engine is a media access control security engine specific to the first MAC and associated with a physical interface.

5. The system of claim 1 comprising:
the security engine, including a table of secure associations to specify a key for encryption of the data packet, to process the data packet by encrypting upon egress of the data packet to the secure link.

6. The system of claim 1 comprising:
the second MAC, specific to the second security engine, to encrypt the data packet prior to transmission.

7. The system of claim 6 wherein the integrated circuit is to:
track a number of secure associations at the first security engine and the second security engine.

8. A non-transitory machine-readable storage medium encoded with instructions executable by a processor of a computing device, the storage medium comprising instructions to:
determine, by processing a header of a data packet, that the data packet should be processed by a security engine specific to a first media access control (MAC) and shared among multiple communication links that include a secure link;
route the data packet to the security engine for transmission on the secure link;
determine that the shared security engine is operating with a maximum number of secure associations upon ingress of the data packet;
identify a second security engine, specific to a second MAC, with an available secure association;
based on the identification of the second security engine, route the data packet from the security engine to the second security engine; and
perform, at the second security engine, a cryptographic function on the data packet prior to transmission.

9. The non-transitory machine-readable storage medium including the instructions of claim 8 to determine that the data packet should be processed by the security engine is comprising instructions to:
identify that the data packet is encrypted;
route the data packet to the first MAC specific to the security engine; and
decrypt, at the security engine, the data packet.

10. The non-transitory machine-readable storage medium including the instructions of claim 8 wherein based on the determination that the data packet should not be processed by the security engine, the non-transitory machine-readable storage medium comprises instructions to:
route the data packet to a non-secure link among the multiple communication links for transmission.

11. The non-transitory machine-readable storage medium including the instructions of claim 8 wherein to determine that the data packet should be processed by the security engine comprises instructions to:
determine that the data packet includes sensitive data; and
encrypt, at the security engine, the data packet.

12. The non-transitory machine-readable storage medium including the instructions of claim 8 wherein to determine that the data packet should be processed by the security engine is comprising instructions to:
in response to a determination that the data packet includes sensitive data, route the data packet to the first MAC; and
encrypt the data packet prior to transmission on the secure link.

13. A method, executed by a networking device, the method comprising:
receiving a data packet;
determining that the data packet should be processed by a security engine shared among multiple communication links including a secure link and specific to a first media access control (MAC);
in response to the determination, routing the data packet to the security engine;
performing a cryptographic function on the data packet prior to transmission on the secure link;
determining that the shared security engine is operating with a maximum number of secure associations according to a table;
identify a second security engine, specific to a second MAC, with an available secure association:
based on the identification of the second security engine, route the data packet from the security engine to the second security engine; and
perform, at the second security engine, the cryptographic function on the data packet prior to transmission.

14. The method of claim 13 wherein determining that the data packet should be processed by the security engine comprises: further comprising:
processing a header of the data packet to determine that the data packet is encrypted;
based upon the determination the data packet is encrypted, routing the data packet to the first MAC.

15. The method of claim 13 wherein if the determination is the data packet should not be processed by the shared security engine, the method is further comprising:
routing the data packet to the non-secure link for transmission.

16. The method of claim 13 comprising:
tracking a number of secure associations at the security engine.

* * * * *